United States Patent
Murata et al.

(10) Patent No.: US 6,278,513 B1
(45) Date of Patent: Aug. 21, 2001

(54) IMAGE READER AND DIGITAL COPIER WITH VARIABLE SECONDARY SCANNING SPEED OF AN IMAGE SCANNING UNIT

(75) Inventors: Kazuyuki Murata, Kyotanabe; Takehito Yamaguchi; Hideyuki Kuwano, both of Hirakata; Yuji Okada, Takarazuka; Joji Tanaka, Moriguchi; Naoki Takahashi, Hirakata; Kenji Hisatomi, Moriguchi, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/233,347

(22) Filed: Jan. 19, 1999

(30) Foreign Application Priority Data

Oct. 16, 1998 (JP) .................................................. 10-294932

(51) Int. Cl.[7] ........................... G03B 13/24; G03B 27/52; G01J 1/42; H04N 1/40
(52) U.S. Cl. ........................... 355/44; 355/40; 250/208.3; 358/448
(58) Field of Search ................................ 355/44, 63, 40; 382/254; 250/208.3, 208.1; 358/456, 448

(56) References Cited

U.S. PATENT DOCUMENTS

| | | | |
|---|---|---|---|
| 4,835,618 | 5/1989 | Shimizu . | |
| 5,373,372 | 12/1994 | Loewen . | |
| 5,502,495 | * 3/1996 | Bannai et al. | 358/447 |
| 6,032,864 | * 3/2000 | Hamasuna | 235/462.25 |
| 6,051,826 | * 4/2000 | Arimoto et al. | 250/208.1 |

FOREIGN PATENT DOCUMENTS 0 105 517   10/1983   (EP) .

* cited by examiner

Primary Examiner—Russell Adams
Assistant Examiner—Peter B. Kim
(74) Attorney, Agent, or Firm—Rosenthal & Osha L.L.P.

(57) ABSTRACT

A digital copier includes an image reading part and a printing part. The image reading part includes reading means for electrically scanning lines of image information of a document in a primary scanning direction at a predetermined cycle to output image signals for the lines; secondary scanning means for mechanically moving a primary scanning position with respect to the document at a constant secondary scanning speed V in a secondary scanning direction perpendicular to the primary scanning direction; and line thinning means for thinning out lines for the image signals to 1/N where N is an integer. The printing part prints an image on a printing medium based on the image signals supplied from the image reading part. The lines of image information of the document are copied at an arbitrary zoom ratio in the secondary scanning direction by combining a value of the integer N and a value of the secondary scanning speed V.

9 Claims, 10 Drawing Sheets

IMAGE READER AND DIGITAL COPIER WITH VARIABLE SECONDARY SCANNING SPEED OF AN IMAGE SCANNING UNIT

BACKGROUND OF THE INVENTION

1. Field of the Invention

The present invention relates to an image reader and a digital copier, more specifically, an image reader capable of reading images at an arbitrary scanning resolution and a digital copier capable of copying at an arbitrary zoom ratio.

2. Description of the Prior Art

High-speed and multifunctional digital copiers have been available recently, and fast speed for first copy time is demanded in the processing of contraction or enlargement.

Hereinafter, an example of a conventional digital copier will be described with reference to FIGS. 9 and 10. FIG. 9 is a block diagram showing the flow of image signals of a conventional digital copier. An image sensor 71 scans a document and converts reflected light from the document into an electric signal. An A/D converter 72 converts an analog image signal from the image sensor 71 to a digital image signal. An image processing circuit 73 performs image processing such as edge enhancement, trimming, and half-tone processing or editing processing with respect to the digital image signal. A line buffer memory 74 buffers the image signal from the image processing circuit 73 for speed adjustment for outputting the image signal to a laser driver 78. The laser driver 78 drives a semiconductor laser 79 to output laser beams for formation of electrostatic latent images.

FIG. 10 shows a schematic structure of a conventional digital copier. The digital copier includes an image scanning part A and a laser printing part B. The image scanning part A includes an ADF (auto document feeder), a document table 0, a constant speed unit 3 including an exposure lamp 1 and a first mirror 2, a half speed unit 6 including a second mirror 4 and a third mirror 5, a lens 7, and an image sensor 8.

The laser printing part B includes a laser scanner unit including a semiconductor laser, a polygon motor, a polygon mirror and a laser optical system, a mirror 41, a photoconductor drum 9, a main charger 10, a developer 11, a transfer charger 20, a cleaner 35, an electricity removal lamp 36, a conveyer belt 30, a fixer 31, a guide 32, a paper ejection roller 33, paper feed rollers 12, 13, and 14, a guide 18, a timing roller 19 and a sorter 34.

The operation of the conventional digital copier having the described structure will be described below. A plurality of documents placed on the ADF 50 are fed one by one by the ADF and placed face down on the document table 1 formed of a transparent glass sheet. The document is exposed to light by the exposure lamp 1. The first mirror 2 reflects the reflected light from the document in the direction of the second mirror 4. The constant speed unit 3 including the exposure lamp 1 and the first mirror 2 scans the document while moving at a constant speed in the direction shown by arrow P. The second mirror 4 and the third mirror 5 reflect the reflected light from the first mirror 1 further. The half speed unit 6 including the second mirror 4 and the third mirror 5 moves at a speed half that of the constant speed unit 3 in the same direction as the constant speed unit 3. The reflected light from the document is converged to the image sensor 8 by the lens 7.

The image sensor 8 is a linear sensor that is longer in the direction perpendicular to the direction of the movement on the surface of the document. In the following description, an electric scanning direction along the longitudinal direction of the image sensor 8 is referred to as a primary scanning direction, and a mechanical scanning direction along the direction of the movement of the constant speed unit 3 is referred to as a secondary scanning direction.

The photoconductor drum 9 rotates at a constant speed in the direction shown by arrow R. The main charger 10 charges the photoconductor drum 9 uniformly. The laser beams radiated from the laser scanner unit 40 is reflected at the mirror 41 for exposure and scanning on the photoconductor drum 9 so that electrostatic latent images are formed on the photoconductor drum 9. The developer 11 develops the electrostatic latent images with toner, and forms toner images on the photoconductor drum 9. In the photoconductor drum 9, a direction parallel to the rotation axis corresponds to the primary scanning direction, and the rotation direction of the photoconductor drum corresponds to the secondary scanning direction.

Recording paper cassettes 15, 16, and 17 hold a plurality of recording papers. The recording paper cassettes each hold different types of recording papers. The recording paper cassettes are removable so that the cassettes holding recording papers having necessary size and direction are removably mounted to the copier. The paper feed rollers 12, 13 and 14 feed one recording paper at a time from the recording paper cassettes. The guide 18 guides the fed recording paper to the ting roller 19. The timing roller 19 adjusts feed timing and performs registration so that the toner images on the photoconductor drum 9 are on the fed recording paper.

The toner images on the photoconductor drum 9 are transferred onto the recording paper by an electric field generated by the transfer charger 20. The conveyer belt 30 moves in the direction shown by arrow Q and conveys the recording paper with the toner images transferred to the fixer 31. The fixer 31 fixes the toner images onto the recording paper by heat. The recording paper with the images fixed thereon is guided by the guide 32 to the paper ejection roller 33. The paper ejection roller 33 ejects the paper to the sorter 34. The sorter 34 is provided with a plurality of paper ejection trays (bins) and performs gathering for each set of copies mechanically. The sorter 34 also includes a staple function and a punch function.

Toner that remains on the photoconductor drum 9 is removed by the cleaner 35. Then, the electricity removal lamp 36 radiates light to the photoconductor drum 9 so that the charges on the photoconductor drum disappear.

Given such a sequence of operations in the image scanning part and the printing part, the primary scanning cycle in the image scanning part is equal to the primary scanning cycle of the printing part. Therefore, copying with contraction or enlargement in the secondary scanning direction can be achieved by changing the secondary scanning speed of the printing part or the image scanning part. Typically, copying with contraction or enlargement in the secondary scanning direction is performed by allowing the secondary scanning speed of the printing part to be constant and the secondary scanning speed of the image scanning part to be different from that of copying in equal size. The relationship between the secondary scanning speed $V_0$ of the image scanning part for equal size copying and the secondary scanning speed $V_Z$ of the image scanning part for copying at a zoom ratio R is as follows:

$$V_Z = V_0/R.$$

This conventional method for contraction and enlargement copying is disclosed in Japanese Laid-Open Patent Publication No. 59-63868.

The minimum zoom ratio in the current digital copier is generally 33% or 25%. In the structure as described above, for example, in the case of copying at a contraction ratio of 33%, the image scanning part is required to scan in the secondary direction at three times the speed for equal size copying. In this case, it is necessary to design the torque of the motor and the secondary scanning mechanism so that the image scanning part can operate at a secondary scanning speed of three times the regular speed, in order to copy at the minimum zoom ratio, which is not frequently used. This is one factor that raises the cost.

Furthermore, in the case of a high-speed digital copier that can perform equal size copying at high speed, copying at a zoom ratio of 33% or 25% requires the image scanner to perform secondary scanning at excessively high speed, which is structurally difficult to realize. Therefore, the minimum contraction ratio is restricted to 70% or 50%.

In the case of enlargement copying, for example, of 400%, the image scanning part is required to perform secondary scanning at a speed of ¼ of that for equal size copying. The secondary scanning speed becomes slower than that for equal size copying, so there are no problems such as shortage of the torque of the motor. However, in the case of stepping motor driving, noise and jitter cause problems, and in the case of servomotor driving, shortage of the servo band width causes a problem. Dealing with these problems is another factor that raises the cost.

Another technique for copying with contraction in the secondary scanning direction is to use a page memory. In this technique, contraction in the secondary scanning direction is effected by changing the ratio of thinning lines for image signals read by the image scanner. Furthermore, enlargement in the secondary scanning direction is effected by interpolating lines. The image signals for one page contracted in the secondary scanning direction are stored in the page memory, and then output to the printing part. According to this technique, the secondary scanning speed of the image scanning part for contraction copying is equal to that for equal size copying.

However, the read images are stored in the page memory and then printed, so the first copy time becomes longer. Moreover, the digital thinning or interpolation is performed at an arbitrary ratio, thereby degrading the quality of images. In order to avoid the degradation of the quality of images, interpolation operation between lines is performed. This, however, requires line buffers for several lines, thereby raising the cost.

SUMMARY OF THE INVENTION

Therefore, with the foregoing in mind, it is an object of the present invention to provide an image reader having a minimum reading resolution that can be set in a wide range without significantly raising or reducing the secondary scanning speed of the image scanning part and a digital copier having a zoom ratio that can be set in a wide range.

In order to achieve the object, a first image reader of the present invention includes reading means for electrically scanning lines of image information of a document in a primary scanning direction at a predetermined cycle to output image signals for each line; secondary scanning means for mechanically moving a primary scanning position with respect to the document at a constant secondary scanning speed V in a secondary scanning direction perpendicular to the primary scanning direction; and line thinning means for thinning out lines for the image signals to 1/N where N is an integer. The lines of image information of the document are read at an arbitrary resolution in the secondary scanning direction by combining a value of the integer N and a value of the secondary scanning speed V.

The first image reader of the present invention provides the line thinning means with a simpler structure and eliminates the necessity of raising the secondary scanning speed by correlating the integer N corresponding to the number of thinning and the secondary scanning speed V and combining the former and the latter so as to cope with an arbitrary resolution.

In the first image reader, the value of the integer N and the value of the secondary scanning speed V are preferably determined based on the following equations:

$$N = \text{INT}(r_0/r)$$

$$V = V_0 \cdot r_0 / (N \cdot r)$$

where $r$ represents a resolution in the secondary scanning direction that can be set arbitrarily, $r_0$ represents a preset reference reading resolution, INT () represents an operator for rounding up decimals to a next integer, and $V_0$ represents a reference secondary scanning speed at a resolution $r_0$.

According to this image reader, when a resolution $r$ equal to or more than the predetermined reference reading resolution $r_0$ in the secondary scanning direction is set, the integer N is 1. Therefore, line thinning is not substantially performed by the line thinning means. The set resolution $r$ can be obtained when the secondary scanning speed V satisfies the equation $V = V_0 \cdot r_0 / r$. When a resolution $r$ less than the reference resolution $r_0$ is set, $N \geq 2$ is satisfied, and line thinning is performed and the secondary scanning speed V satisfies the equation $V = V_0 \cdot r_0 / (N \cdot r)$. Therefore, the secondary scanning speed V at an arbitrarily set resolution $r$ does not exceed $V_0$.

A second image reader of the present invention includes reading means for electrically scanning lines of image information of a document in a primary scanning direction at a predetermined cycle to output image signals for every line; secondary scanning means for mechanically moving a primary scanning position with respect to the document at a constant secondary scanning speed V in a secondary scanning direction perpendicular to the primary scanning direction; and line thinning means for thinning out lines for the image signals to (N/M (N and M are integers: $N \leq M$). A continuous variation range in which the secondary scanning speed V can be varied is from Vmin to Vmax. The lines of image information of the document are read at an arbitrary resolution in the secondary scanning direction by combining a value of N/M and a value of the secondary scanning speed V. The second image reader of the present invention makes it possible to read images at a desired low resolution at a speed equal to or less than the maximum secondary scanning speed (Vmax) corresponding to a desired minimum resolution.

In the second image reader, secondary scanning preferably can be performed at least at one speed Vi that is smaller than Vmin and is outside and non-adjacent to the variation range. According to this image reader, a desired resolution can be achieved at a speed more than the minimum secondary scanning speed (Vi). For example, when the secondary scanning speed at a reference resolution ro is represented by $V_0$, Vmin is $V_0/2$, and Vi is $V_0/4$, the scanning resolution between $2r_0$ and $4r_0$ can be achieved by satisfying the equations: $V = Vi$, $½ < N/M \leq 1$. In this case, in addition to the range from Vmin to Vmax for the secondary scanning speed, it is sufficient to satisfy the necessity for performance for scanning precision, suppression of noise and necessary torque at a fixed speed of $V_0/4$.

Next, a first digital copier of the present invention includes an image reading part and a printing part. The image reading part includes reading means for electrically scanning lines of image information of a document in a primary scanning direction at a predetermined cycle to output image signals for each line; secondary scanning means for mechanically moving a primary scanning position with respect to the document at a constant secondary scanning speed V in a secondary scanning direction perpendicular to the primary scanning direction; and line thinning means for thinning out lines for the image signals to 1/N where N is an integer. The printing part prints an image on a printing medium based on the image signals supplied from the image reading part. The lines of image information of the document are copied at an arbitrary zoom ratio in the secondary scanning direction by combining a value of the integer N and a value of the secondary scanning speed V.

The first digital copier of the present invention provides the line thinning means with a simpler structure and eliminates the necessity of raising the secondary scanning speed by correlating the integer N corresponding to the number of thinning and the secondary scanning speed V and combining the former and the latter so as to cope with an arbitrary zoom ratio (magnification for contraction and enlargement).

In the first digital copier, the value of the integer N and the value of the secondary scanning speed V are preferably determined based on the following equations:

$$N = INT(R_0/R)$$

$$V = V_0/(N \cdot R)$$

where R represents a zoom ratio in the secondary scanning direction that can be set arbitrarily, $R_0$ represents a preset reference zoom ratio, INT () represents an operator for rounding up decimals to a next integer, and $V_0$ represents a reference secondary scanning speed at the zoom ratio $R_0$. According to this digital copier, when a zoom ratio R equal to or more than the predetermined reference zoom ratio $R_0$ is set (N=1), line thinning is not substantially performed. The zoom ratio R that is set can be obtained when the secondary scanning speed V satisfies the equation $V = V_0/R$. When a zoom ratio R less than the reference zoom ratio $R_0$ is set (N≧2), line thinning is performed and the secondary scanning speed V satisfies the equation $V = V_0/(N \cdot R)$. Therefore, the secondary scanning speed V at an arbitrarily set zoom ratio R does not exceed $V_0/R_0$.

In the image reader, the image reading part preferably includes an image memory for storing image signals thinned out by the line thinning means. The image reading part is preferably configured so that when the set zoom ratio R is equal to or more than the reference zoom ratio $R_0$, the image signals from the reading means are supplied to the printing part without line thinning, and when the set zoom ratio R is less than the reference zoom ratio $R_0$, thinned out image signals are supplied to the printing part via the image memory. Such a digital copier prevents the reduction in the copying speed by reading image signals from the image memory for printing when the same document is copied successively.

Furthermore, the image reading part preferably includes a pseudo-half-tone processing circuit by a dot area modulation method for binarizing the image signals thinned out by the line thinning means, an image memory for storing binary image signals, a binary-to-multivalue conversion circuit for conversing the binary image signals read from the image memory to multivalued image signals. The image reading part is preferably configured so that when the set zoom ratio R is equal to or more than the reference zoom ratio $R_0$ the multivalued image signals from the reading means are supplied to the printing part without line thinning, and when the set zoom ratio R is less than the reference zoom ratio $R_0$, thinned out image signals are supplied to the printing part via the pseudo-half-tone processing circuit, the image memory, and the binary-to-multivalue conversion circuit. Such a digital copier requires less memory capacity for the image memory.

Furthermore, the image reading part preferably includes a pseudo-half-tone processing circuit by a dot area modulation method for binarizing the image signals thinned out by the line thinning means, a compression circuit for compressing binary image signals, an image memory for storing compressed image signals, an expansion circuit for expanding the compressed signals read from the image memory, a binary-to-multivalue conversion circuit for conversing the expanded binary image signals to multivalued image signals. The image reading part is preferably configured so that when the set zoom ratio R is equal to or more than the reference zoom ratio $R_0$, the multivalued image signals from the reading means are supplied to the printing part without line thinning, and when the set zoom ratio R is less than the reference zoom ratio $R_0$, thinned out image signals are supplied to the printing part via the pseudo-half-tone processing circuit, the compression circuit, the image memory, the expansion circuit and the binary-to-multivalue conversion circuit. Such a digital copier requires less memory capacity for the image memory.

Furthermore, preferably, the reference zoom ratio $R_0$ is approximately 70%. A typical zoom ratio is 70% or more, as in the case of contraction copying from an A3 size document to an A4 size recording paper. Therefore, in the case of a reference zoom ratio $R_0$ of about 70%, when a zoom ratio more than the reference zoom ratio is set, N=1 results, as described above. In this case, line thinning is not substantially performed, so that the speed for the first copy time is not reduced.

The image memory is preferably a FIFO memory, and the image reading part is preferably configured so that when image signals corresponding to (N−1)/N of image signals for one page are stored in the image memory, the image signals stored in the image memory are sequentially output to the printing part to start printing the images. According to this digital copier, for example, in the case of N=2, at the point when image signals for ½ page of a document are read and stored in the image memory, the image signals are output to the printing part sequentially from the image signal stored first. Thus, the reduction in the speed for the first copy time can be suppressed.

Next, a second digital copier of the present invention includes an image reading part and a printing part. The image reading part includes reading means for electrically scanning lines of image information of a document in a primary scanning direction at a predetermined cycle to output image signals for each line; secondary scanning means for mechanically moving a primary scanning position with respect to the document at a constant secondary scanning speed V in a secondary scanning direction perpendicular to the primary scanning direction; and line thinning means for thinning out lines for the image signals to N/M where N and M are integers: N≦M. The printing part prints an image on a printing medium based on the image signals supplied from the image reading part. A continuous variation range in which the secondary scanning speed V can be varied is from Vmin to Vmax. The lines of image information of the document are copied at an arbitrary zoom ratio in the secondary scanning direction by combining a value of N/M and a value of the secondary scanning speed V.

According to the second digital copier, a desired contraction ratio can be achieved at a speed less than the maximum secondary scanning speed (Vmax) corresponding to a desired minimum zoom ratio (contraction). For example, when the secondary scanning speed for equal size copying is represented by $V_0$, and Vmax is $V_0 \times 2$, the contraction ratio between 25% and 50% can be achieved by satisfying the equations: $V=V_0 \times 2$, and $\frac{1}{2} \leq N/M < 1$.

In the second digital copier, the image reading part preferably includes an image memory for storing image signals thinned out by the line thinning means. The image reading part is preferably configured so that when N/M is equal to 1, the image signals from the reading means are supplied to the printing part without going through the image memory, and when N/M is less than 1, the image signals thinned out by the line thinning means are supplied to the printing part via the image memory. Such a digital copier prevents the reduction in the copying speed by reading image signals from the image memory for printing when the same document is copied successively.

Furthermore, the image reading part preferably includes a pseudo-half-tone processing circuit by a dot area modulation method for binarizing the image signals thinned out by the line thinning means, an image memory for storing the binary image signals, a binary-to-multivalue conversion circuit for conversing the binary image signals read from the image memory to multivalued image signals. The image reading part is preferably configured so when N/M is less than 1, the image signals thinned out by the line thinning means are supplied to the printing part via the pseudo-half-tone processing circuit, the image memory and the binary-to-multivalue conversion circuit, and when N/M is equal to 1, the image signals from the reading means are supplied to the printing part without going through the image memory. Such a digital copier requires less memory capacity for the image memory.

Furthermore, the image reading part preferably includes a pseudo-half-tone processing circuit by a dot area modulation method for binarizing the image signals thinned out by the line thinning means, a compression circuit for compressing binary image signals, an image memory for storing compressed image signals, an expansion circuit for expanding the compressed signals read from the image memory, a binary-to-multivalue conversion circuit for conversing the expanded binary image signals to multivalued image signals. The image reading part is preferably configured so when N/M is less than 1, the image signals thinned out by the line thinning means are supplied to the printing part via the pseudo-half-tone processing circuit, the compression circuit, the image memory, the expansion circuit and the binary-to-multivalue conversion circuit, and when N/M is equal to 1, the image signals from the reading means are supplied to the printing part without going through the image memory. Such a digital copier requires less memory capacity for the image memory.

Furthermore, secondary scanning preferably can be performed at least at one speed Vi that is smaller than Vmin and is outside and non-adjacent to the variation range. According to this digital copier, a desired enlargement ratio can be achieved at a speed more than the minimum secondary scanning speed (Vi) corresponding to a desired maximum zoom ratio (enlargement). For example, when the secondary scanning speed for equal size copying is represented by $V_0$, Vmin is $V_0/2$ and Vi is $V_0/4$, the enlargement ratio between 200% and 400% can be achieved by satisfying the equations: $V=Vi$, $\frac{1}{2} < N/M \leq 1$. In this case, in addition to the range from Vmin to Vmax for the secondary scanning speed, it is sufficient to satisfy the requirements to achieve scanning precision, the suppression of noise and necessary performance for necessary torque of the motor at a fixed speed of $V_0/4$.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples with reference to the accompanying drawings.

EXAMPLE 1

Figure 1:
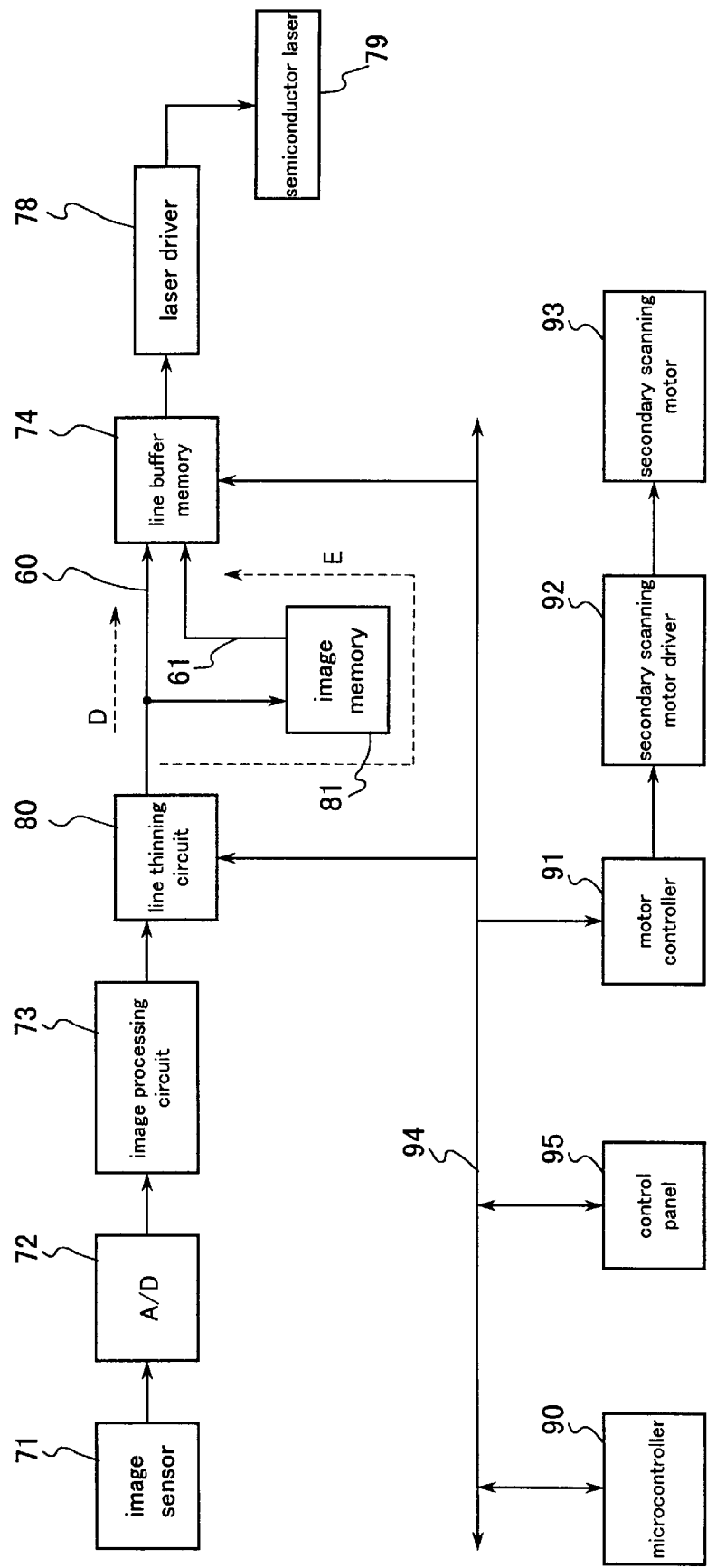
FIG. 1 is a block diagram showing the flow of image signals in a digital copier of Example 1 of the present invention.
Figure 9:
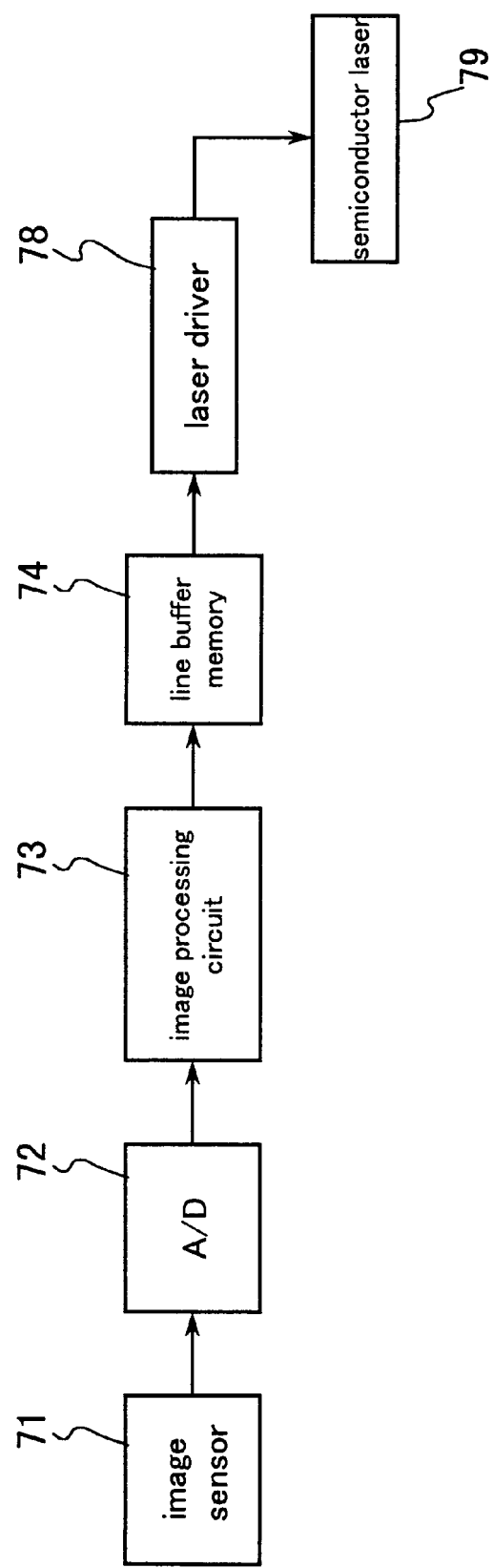
FIG. 9 is a block diagram showing the flow of image signals in a conventional digital copier.

FIG. 1 shows the flow of image signals of a digital copier of Example 1 of the present invention. In FIG. 1, the same components as shown in the conventional example of FIG. 9 bear the same reference numerals as those in FIG. 9. An image sensor 71 scans a document and converts reflected light from the document into an electric signal. An A/D converter 72 converts an analog image signal from the image sensor 71 to a digital image signal. An image processing circuit 73 performs image processing such as zoom processing in the primary scanning direction, edge enhancement, trimming, and half-tone processing or editing processing with respect to the digital image signal. The zoom processing in the primary scanning direction is performed by conventional methods such as interpolation, thinning or the like.

A line thinning circuit 80 thins out the image signals from the image processing circuit 73 to 1/N. A microcontroller 90 sets a thinning ratio N, which is an integer, in the line thinning circuit 80 via a bus 94. An image memory 81 stores image signals 60 for one page of a document from the line thinning circuit 80. A line buffer memory 74 buffers the image signal 60 or an image signal 61 read from the image memory 81 for speed adjustment for outputting the signals to the laser driver 78.

The microcontroller 90 sets which of the image signals (60 or 61) is input to the line buffer memory 74 via the bus 94. In FIG. 1, a broken line D shows the path of the image signal when the image signal 60 is input to the line buffer memory 74 (hereinafter, referred to as "path D"), and a broken line E shows the path of the image signal when the image signal 61 is input to the line buffer memory 74 (hereinafter, referred to as "path E"). A laser driver 78 drives a semiconductor laser 79 to output laser beams for formation of electrostatic latent images.

The microcontroller 90 includes a RAM and a ROM, and controls the entire digital copier. A motor controller 91 controls a secondary scanning motor 93 of the image scanning part using a secondary motor driver 92. The microcontroller 90 sets a secondary scanning speed in the motor controller 91 via the bus 94. A control panel 95 acting as an interface between the copier and the operator includes a display such as a liquid crystal panel and LED and buttons for entry of parameters such as ten keys. The operator enters parameters such as a zoom ratio for copying using the control panel 95. The entered values such as a zoom ratio are read by the microcontroller 90 via the bus 94.

Figure 4:
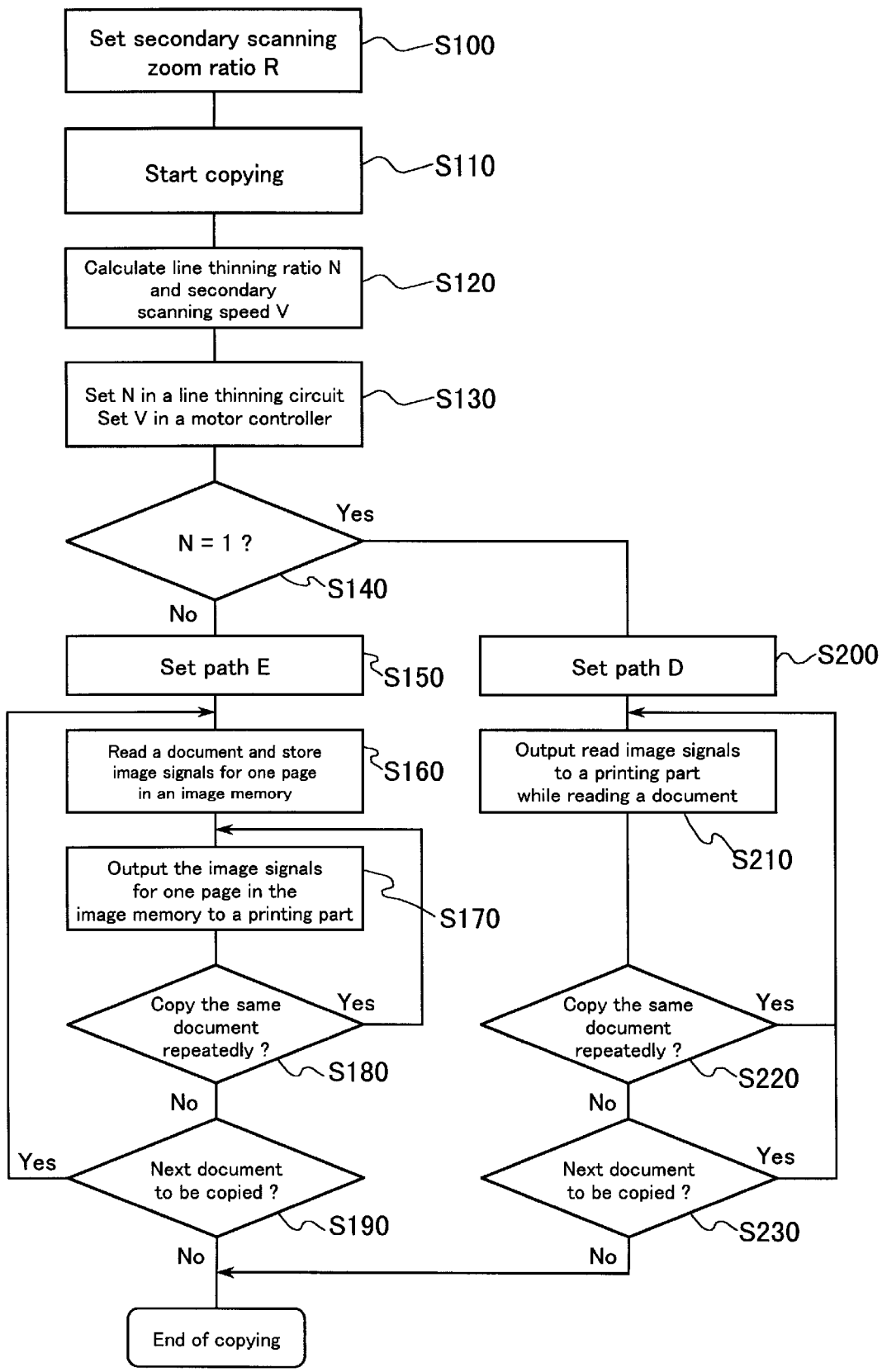
FIG. 4 is a flow chart when the digital copier of Example 1 is used for copying.

FIG. 4 is a flow chart when the digital copier of this example is used for copying. The operator sets copying conditions such as a zoom ratio for copying using the control panel 95 (S100) and instructs the start of copying (S110). The microcontroller 90 calculates the line thinning ratio N and the secondary scanning speed V of the image scanning part based on the following equations (S120):

$$N = INT(R_0/R)$$

$$V = V_0/(N \cdot R)$$

where R represents a zoom ratio in the secondary scanning direction, $V_0$ represents a secondary scanning speed of the image scanning part for equal size copying, INT () represents an operator for rounding up decimals to a next integer, and $R_0$ represents a reference zoom ratio (contraction ratio). In copying at a zoom ratio R equal to or more than the reference zoom ratio $R_0$, line thinning is not performed, and zoom processing is performed only by setting the secondary scanning speed of the image scanning part. The operation of reading a document of the image scanning part is performed in synchronization with the operation of forming images of the printing part (real-time copy mode). When a zoom ratio R less than the reference zoom ratio $R_0$ is set, the read document images for one page are stored in the image memory 81, and read out and recorded in the printing part (memory copy mode).

For example, when the reference zoom ratio $R_0$ is 0.7 and a zoom ratio R of 0.5 is set, a thinning ratio N=2 and a secondary scanning speed $V=V_0$ result. When the zoom ratio R is set to 0.6, a thinning ratio N=2 and a secondary scanning speed $V=V_0/1.2$ result. Whatever zoom ratio R is set, the secondary scanning speed V does not exceed the secondary scanning speed ($V_0/R_0$ at a zoom ratio $R_0$.

The microcontroller 90 sets the calculated thinning ratio N in the line thinning circuit 80, and sets the secondary scanning speed V in the motor controller 91 (S130). The microcontroller 90 checks the value of N (S140).

When N is 1, the microcontroller 90 sets the path D for input to the line buffer memory 74 (S150), and sets the path E when N is not 1 (S200). The fact that N is not 1 means that the set zoom ratio R is smaller than the reference zoom ratio $R_0$.

When the path E is set, document images for one page are read by the image scanning part and stored in the image memory 81 (S160). After the accumulation of the images for one page, the document images stored in the image memory 81 are output to the printing part (S170). In order to print the same document again, the process of S170 is repeated (S180). When another document is to be copied, the flow returns to step S160 after replacement of the documents.

When the path D is set, reading images for one page of a document by the image scanning part is executed in synchronization with printing by the printing part (S210). In order to copy the same document again, step 210 is repeated (S230). When another document is to be copied, the flow returns to step S210 after replacement of the documents.

In the digital copier of this example, the secondary scanning speed of the image scanning part does not exceed $V_0 R_0$ in any copying contraction ratio. Therefore, inlike the conventional digital copier, the minimum zoom ratio is not restricted by the maximum secondary scanning speed of the image scanning part. Consequently, it is not necessary to have the torque or the mechanism of the secondary scanning motor cope with high-speed secondary scanning only for the purpose of reducing the miiimum zoom ratio. Furthermore, the line thinning means has only to thin the image signals to 1/N where N is an integer. This makes the structure simpler than the case where an arbitrary zoom ratio in the secondary scanning direction is realized only by digital zoom processing.

When a zoom ratio equal to or more than the reference zoom ratio is set, a copying operation is performed in the real-time copy mode. Therefore, the speed for the first copy time is equal to that of the conventional copier. When a zoom ratio less than the reference zoom ratio is set, a copying operation is performed in the memory copy mode. Therefore, the speed for the first copy time is lower than that of the conventional copier. However, the zoom ratio that is frequently used is 0.7 or more, as in the case of contraction copying from a A3 size document to a A4 size recording paper. Therefore, when the zoom ratio is set to about 0.7, the speed for the first copy time is rarely reduced. In the case of successive copying of the same document, the images are read from the image memory for printing, so that the speed is not reduced.

A method for suppressing the reduction in the speed the first copy time when a zoom ratio less than the reference zoom ratio is set in this example will be described below. Referring back to FIG. 1, the image memory 81 has a FIFO structure. In the case of a thinning ratio of N, at the point when the image scanning part has read (N−1)/N of the images of the document, the image memory 81 can start to output the image signals to the printing part. For example, in the case of N=2, at the point when the image scanning part has read ½ of the images of a document, the printing part can start printing the images. This method permits the printing part to start printing the images without waiting for completion of the accumulation of the document images for one page in the image memory 81. Thus, the speed for the first copy time is increased.

EXAMPLE 2

Figure 2:
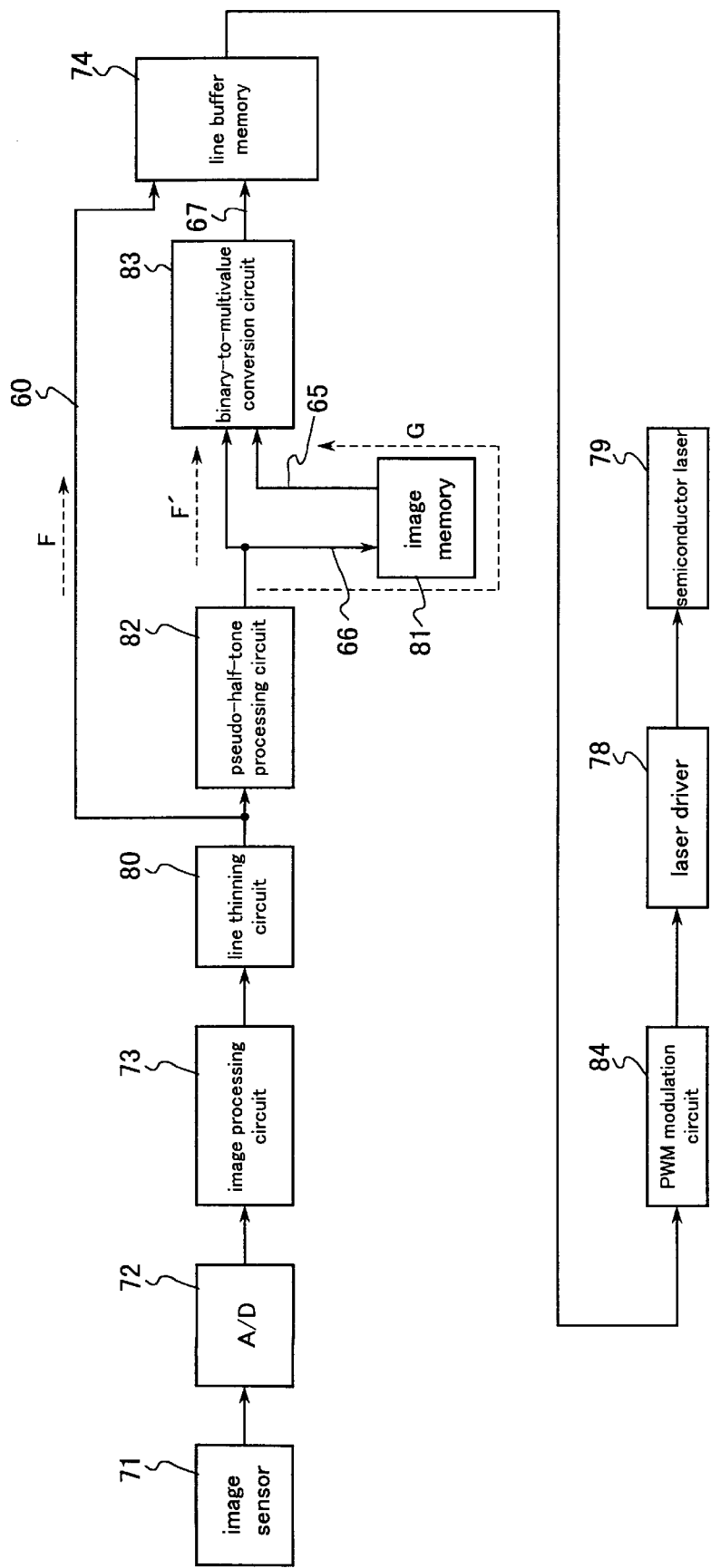
FIG. 2 is a block diagram showing the flow of image signals in a digital copier of Example 2 of the present invention.

FIG. 2 shows the flow of image signals of a digital copier of Example 2 of the present invention. In FIG. 2, the same components as shown in FIG. 1 bear the same reference numerals as those in FIG. 1. The microcontroller 90, the bus 94, the control panel 95, the motor controller 91, the secondary scanning motor driver 92 and the secondary scanning motor 93 shown in FIG. 1 are not shown in FIG. 2.

The same operation of the same component that has been described with reference to FIG. 1 is not described in FIG. 2. A pseudo-half-tone processing circuit 82 converts a multivalued image signal 60 thinned out to a binary image signal 66 by a dot area modulation method with error diffusing processing. The image memory 81 stores the binary image signal 66 for one page of a document. A binary-to-multivalue conversion circuit 83 restores a binary image signal 65 that has been subjected to pseudo-half-tone processing to a multivalued image signal. The binary-to-multivalue converting processing is performed by known region identification processing and smoothing processing.

A line buffer memory 74 buffers a multivalued image signal 60 from the line thinning circuit 80 or a multivalued image signal 67 from the binary-to-multivalue conversion circuit 83 for speed adjustment for outputting the image signal to a PWM modulation circuit 84. The microcontroller 90 sets which of the image signals (60 or 67) is input to the line buffer memory 74 via the bus 94. In FIG. 2, a broken line F shows the path of the image signal when the image signal 60 is input to the line buffer memory 74, and a broken line G shows the path of the image signal when the image signal 67 is input to the line buffer memory 74. The PWM modulation circuit 84 modulates the multivalued image data in pulse width. A laser driver 78 drives a semiconductor laser 79 based on the image signal modulated in pulse width.

The flow of the operation for copying in this example is the same as that of Example 1 shown in FIG. 4 except that "path D" and "path E" in FIG. 4 are replaced by "path F", and "path G", respectively.

In Example 1, the image memory is required although it is not required for a conventional digital copier. In the case of multivalued image signals, large memory capacity is required, which raises the cost. In Example 2, the image signal is stored in the image memory 81 in the form of a binary image signal, so that the memory capacity of the image memory 81 required is reduced. Furthermore, since the binary-to-multivalue conversion circuit 83 restores the binary image signal to a multivalued image signal, the degradation of copying quality due to the pseudo-half-tone processing (binary processing) can be prevented.

Furthermore, as in Example 1 (FIG. 1), when the image memory 81 in FIG. 2 is a FIFO memory, the speed for the first copy time can be increased. In FIG. 2, a path F' can be used in the real-time copy mode in place of the path F.

EXAMPLE 3

Figure 3:
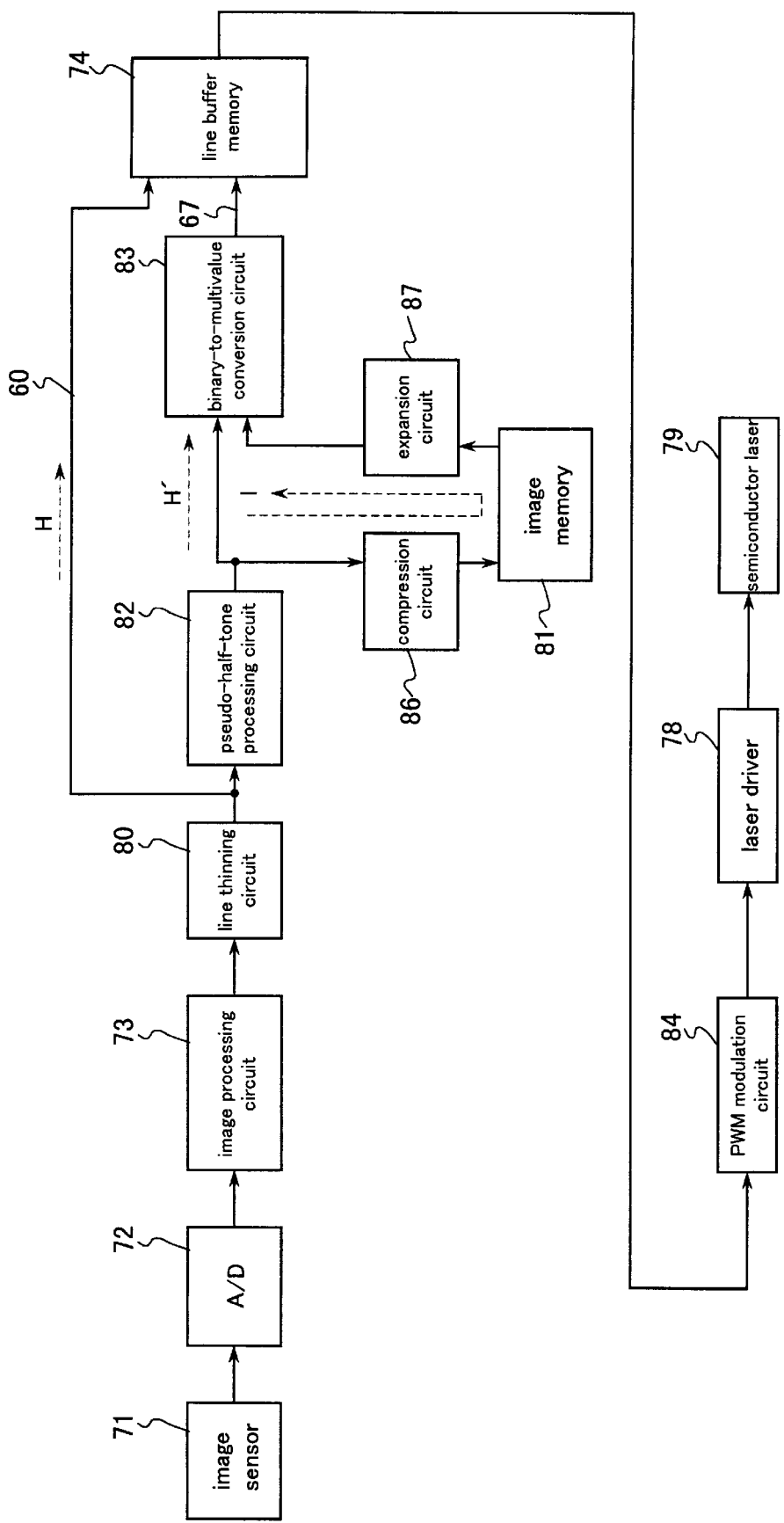
FIG. 3 is a block diagram showing the flow of image signals in a digital copier of Example 3 of the present invention.

FIG. 3 shows the flow of image signals of a digital copier of Example 3 of the present invention. In FIG. 3, the same components as shown in FIG. 2 bear the same reference numerals as those in FIG. 2. The microcontroller 90, the bus 94, the control panel 95, the motor controller 91, the secondary scanning motor driver 92 and the secondary scanning motor 93 shown in FIG. 1 are not shown in FIG. 3.

The operation of the similar components that have been described with reference to FIG. 2 are not described in FIG. 3. A compression circuit 86 encodes the binary image signal that has been subjected to pseudo-half-tone processing for compression. The compression is performed by known JBIG. The image memory 81 stores the coded binary image signals for one page of a document. An expansion circuit 87 decodes the coded binary image signals read from the image memory 81 for expansion. A binary-to-multivalue conversion circuit 83 restores the expanded binary image signal to a multivalued image signal. A line buffer memory 74 buffers a multivalued image signal 60 from the line thinning circuit 80 or a multivalued image signal 67 from the binary-to-multivalue conversion circuit 83 for speed adjustment for outputting the image signal to a PWM modulation circuit 84.

In FIG. 3, a broken line H shows the path of the image signal when the image signal 60 is input to the line buffer memory 74, and a broken line I shows the path of the image signal when the image signal 67 is input to the line buffer memory 74. The flow of the operation for copying in this example is the same as that of Example 1 shown in FIG. 4 except that "path D" and "path E" in FIG. 4 are replaced by "path H" and "path I", respectively.

In this example, the memory capacity of the image memory 81 can be reduced further than in Example 2. Furthermore, as in Example 2, since the binary-to-multivalue conversion circuit 83 restores the binary image signal to the multivalued image signal, the degradation of copying quality due to the pseudo-half-tone processing can be prevented. In FIG. 3, a path H, can be used in the real-time copy mode in place of the path H.

EXAMPLE 4

Figure 5:
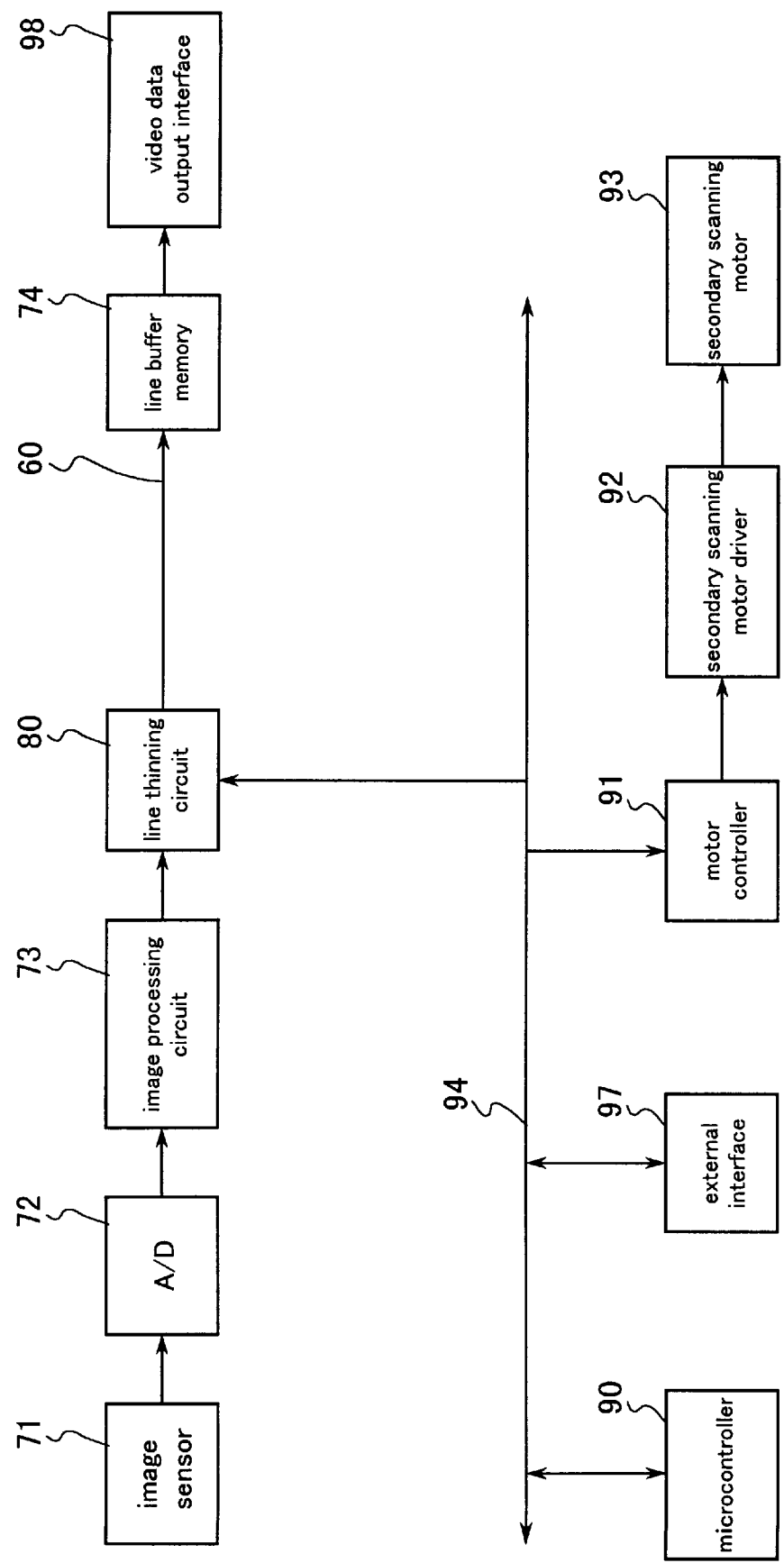
FIG. 5 is a block diagram showing the flow of image signals in an image reader of Example 4 of the present invention.
Figure 10:
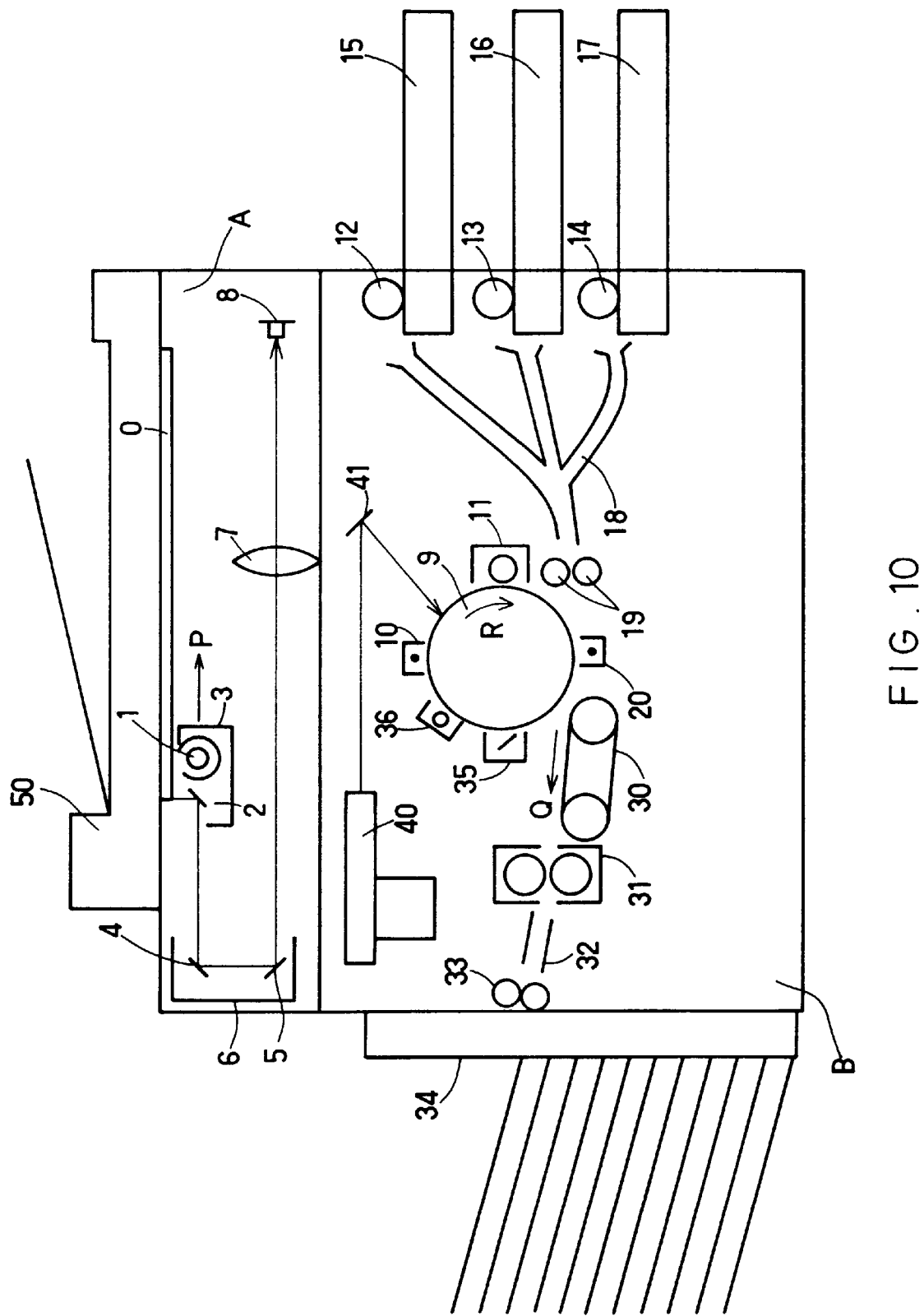
FIG. 10 is a side perspective view schematically showing a conventional digital copier.

FIG. 5 shows the flow of image signals of an image reader of Example 4 of the present invention. This image reader is obtained by using the configuration of the secondary scanning zoom of Example 1 as an image reader, and corresponds to the mechanical structure of the image scanning part in FIG. 10. In FIG. 5, the same components as shown in FIG. 1 bear the same reference numerals as those in FIG. 1. An image sensor 71 scans a document and converts reflected light from the document into an electric signal. An A/D converter 72 converts an analog image signal from the image sensor 71 to a digital image signal. An image processing circuit 73 performs image processing such as zoom processing in the primary scanning direction, edge enhancement, and half-tone processing or editing processing with respect to the digital image signal. The resolution conversion processing in the primary scanning direction is performed by conventional methods such as interpolation, thinning or the like.

A line thinning circuit 80 thins out the image signals from the image processing circuit 73 to 1/N. A microcontroller 90 sets a thinning ratio N to the line thinning circuit 80 via a bus 94. A line buffer memory 74 buffers the image signal 60 and outputs the signals to a video data output I/F. The video data output interface 98 outputs image data and synchronous signals such as pixel clocks, line enable signals, vertical enable signals and the like to external equipment.

The microcontroller 90 includes a RAM and a ROM, and controls the entire image reader. A motor controller 91 controls a secondary scanning motor 93 of the image scanning part using a secondary motor driver 92. The microcontroller 90 sets a secondary scanning speed of the image reader in the motor controller 91 via the bus 94. The microcontroller 90 communicates with the external equipment via an external interface means 97 and receives reading conditions such as a reading resolution, a reading region or the like.

The microcontroller 90 calculates the line thinning ratio N and the secondary scanning speed V of the image scanning part from the secondary scanning resolution r (dpi) that has been set, pursuant to the following equations:

$$N = INT(r_0/r)$$

$$V = V_0 \cdot r_0/(N \cdot r)$$

where r represents a reading resolution in the secondary scanning direction that has been set, $V_0$ represents a secondary scanning speed of the image scanning part when images are read at a reference resolution (e.g., 200 dpi) reference secondary scanning speed), INT () represents an operator for rounding up decimals to a next integer, and $r_0$ is a reference reading resolution. When the secondary scanning resolution r for image reading is equal to or more than the reference reading resolution $r_0$, line thinning is not performed and the reading resolution in the secondary scanning direction is determined only by setting the secondary scanning speed of the image scanning part.

For example, when the reference reading resolution $r_0$ is 200 dpi and a secondary scanning resolution r of 150 dpi is set, a thinning ratio N=2 and a secondary scanning speed V=(⅔)•$V_0$ result. The secondary scanning speed V does not exceed the secondary scanning speed $V_0$ whatever secondary scanning resolution r is set. The microcontroller 90 sets the calculated thinning ratio N in the line thinning circuit 80 and the secondary scanning speed V in the motor controller 91.

In the image reader of this example, the secondary scanning speed of the image scanning part does not exceed $V_0$ in any reading resolution. Therefore, the minimum reading resolution is not restricted by the maximum secondary scanning speed of the image scanning part. Consequently, it is not necessary to have the torque or the mechanism of the secondary scanning motor with high-speed secondary scanning only for the purpose of achieving the minimum reading resolution. Furthermore, the line thinning means has only to thin out the image signals to 1/N where N is an integer. This makes the structure simpler than the case where an arbitrary resolution in the secondary scanning direction is realized only by digital zoom processing.

EXAMPLE 5

The flow of the image signal of a digital copier of Example 5 of the present invention will be described with reference to FIG. 1. The basic structure of Example 5 is the same as that of Example 1, and therefore it is not described herein.

Figure 7:
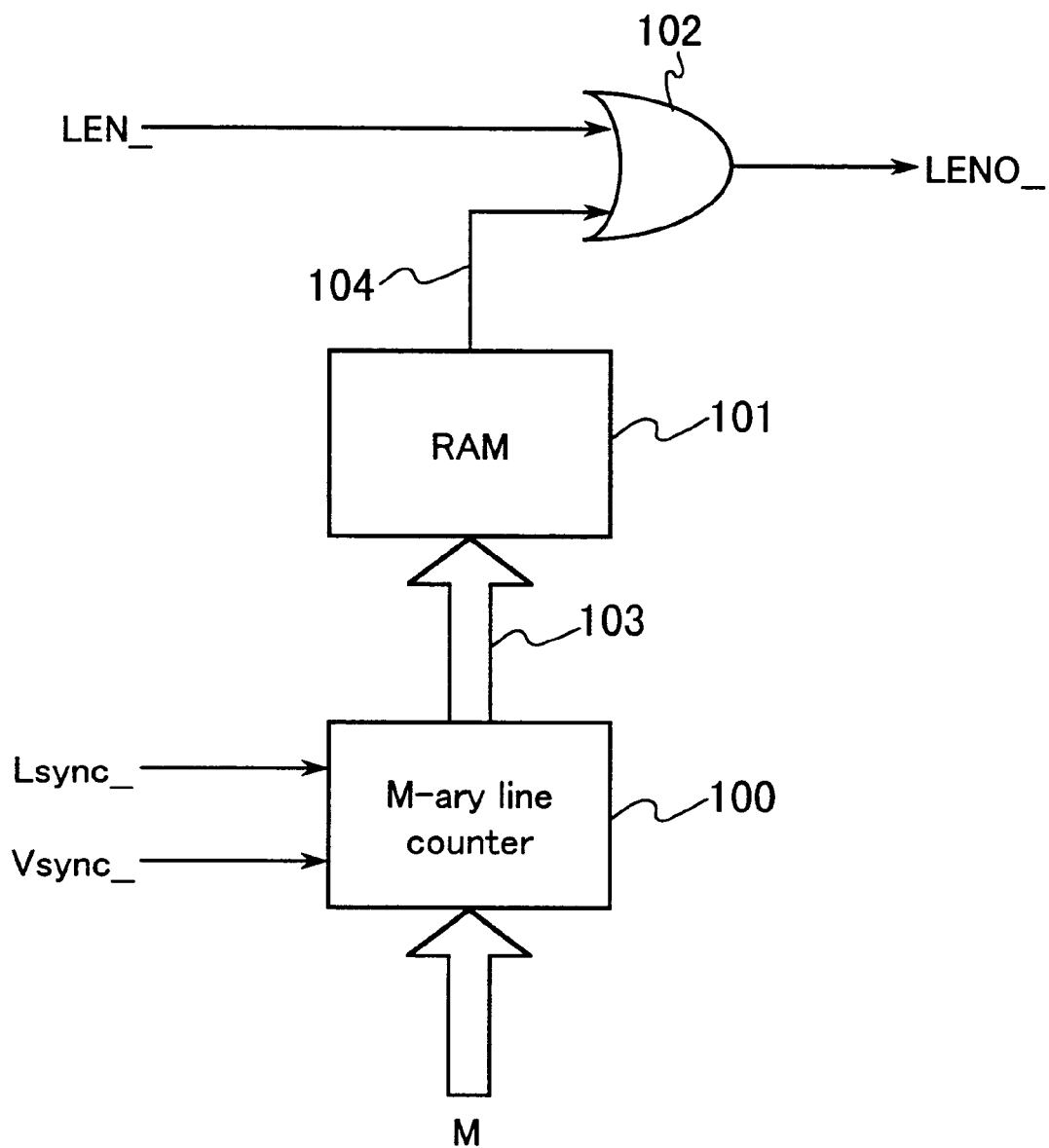
FIG. 7 is a block diagram of a line thinning circuit 80.

A line thinning circuit 80 thins out the image signals from the image processing circuit 73 to N/M. FIG. 7 is a block diagram of the line thinning circuit 80. The operation of the thinning circuit 80 will be described with reference to FIG. 7. An M-ary line counter 100 counts from 0 to M-1 repeatedly, and M is set by the microcontroller 90. A line synchronous signal Lsync, which is an active low pulse signal, is input to a clock input of the M line counter 100. A page synchronous signal Vsync, which is an active low pulse signal, is input to a reset clear input of the M line counter 100.

A bit string is downloaded to an RAM 101 from the microcontroller 90 in advance. A count value 103 of the M-ary line counter 100 is connected to a reading address input of the RAM 101, and a bit string is read from the RAM 101 for every line scanned. Data 104 read from the RAM 101 and an active low line enable signal LEN are input to an OR gate 102. The line enable signal LEN is a signal for indicating that a line image signal is valid at an active level. When the data 104 read from the RAM 101 is 1 (high level), the line enable signal LEN is masked. This means that lines are thinned out. For example, when M=5 is set and a bit string 00101 is downloaded to the RAM 101 from address 0, two out of five lines are thinned out, namely, the number of lines is thinned out to ⅗.

Figure 8:
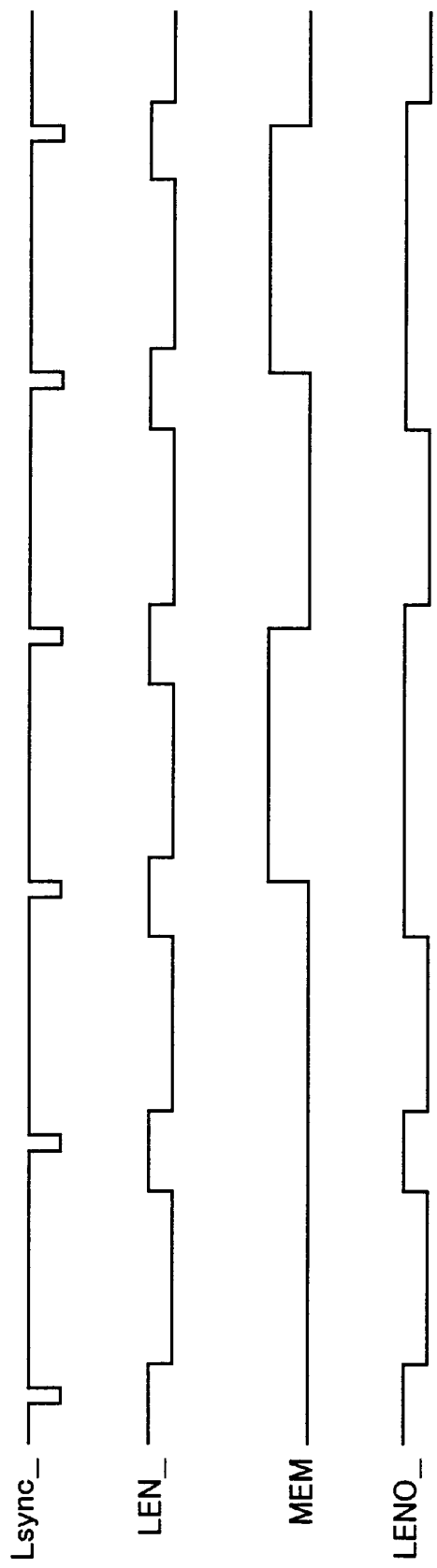
FIG. 8 is a timing chart showing the relationship between line synchronous signals.

FIG. 8 is a timing diagram showing the relationship between line synchronous signals. The line enable signal LEN is present between the line synchronous signals. MEM is data read from the RAM 101 and changes when Lsync becomes high. LENO is a line enable signal masked by the MEM.

Referring back to FIG. 1, the image memory 81 stores image signals 60 from the line thinning circuit 80 for one page of a document. A line buffer memory 74 buffers the image signal 60 or an image signal 61 read from the image memory 81 for speed adjustment for outputting the signals to the laser driver 78.

The microcontroller 90 sets which of the image signals (60 or 61) is input to the line buffer memory 74 via the bus 94.

Figure 6:
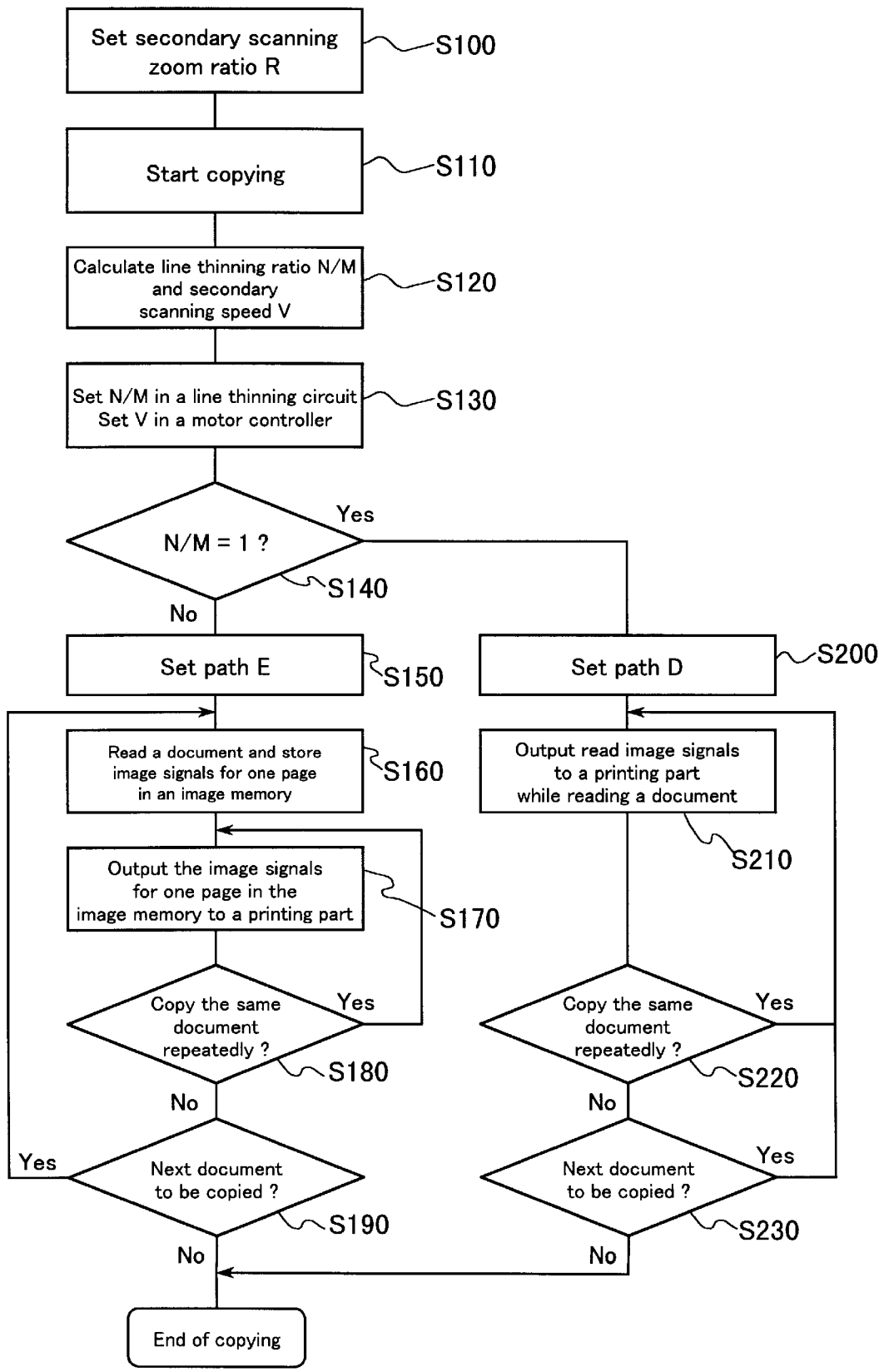
FIG. 6 is a flow chart when the digital copier of Example 5 is used for copying.

FIG. 6 is a flow chart when the digital copier of this example is used for copying. The operator sets parameters such as a zoom ratio for copying using the control panel 95 (S100) and instructs the start of copying (S110). The microcontroller 90 calculates the line thinning ratio N/M and the secondary scanning speed V of the image scanning part based on the following equations (S120):

$$V = \max(\min(Vmax, V_0/R), Vmin)$$

$$N/M = R \cdot V/V_0$$

where R represents a zoom ratio in the secondary scanning direction, $V_0$ represents a secondary scanning speed of the image scanning part for equal size copying, max (a, b) represents an operator for selecting the larger argument, min (a, b) represents an operator for selecting the smaller argument, and Vmax and Vmin are the maximum value and the minimum value of the secondary scanning speed, respectively. When N/M is 1, line thinning is not necessary, and zoom processing is performed only by setting the secondary scanning speed of the image scanning part. The operation of reading a document of the image scanning part is performed in synchronization with the operation of forming images of the printing part (real-time copy mode). When a thinning ratio N/M<1 is set, the read document images for one page are stored in the image memory 81 and read out for recording in the printing part (memory copy mode). Since N/M is a rational number, a smaller magnification error can be achieved as the memory capacity of the RAM 101 and the bit width of M are larger. As described above, regardless of the zoom ratio R, the secondary scanning speed does not exceed Vmax.

The microcontroller 90 sets the calculated thinning ratio N/M in the line thinning circuit 80 and sets the secondary scanning speed V in the motor controller 91 (S130). The microcontroller 90 checks the value of N/M (S140). When N/M is 1, the microcontroller 90 sets the path D for input to the line buffer memory 74 (S150), and sets the path E when N/M is not 1 (S200).

When the path E is set, document images for one page are read by the image scanning part, and stored in the image memory 81 (S160). After the accumulation of images for one page, the document images stored in the image memory 81 are output to the printing part (S170). In order to print the same document again, the process of S170 is repeated (S180). When another document is to be copied, the flow returns to step S160 after replacement of the documents.

When the path D is set, reading images for one page of a document by the image scanning part is performed in synchronization with printing by the printing part (S210). In order to copy the same document again, step 210 is repeated (S230). When another document is to be copied, the flow returns to step S210 after replacement of the documents.

In the digital copier of this example, the secondary scanning speed of the image scanning part does not exceed Vmax in any copying contraction ratio. Therefore, unlike the conventional digital copier, the minimum zoom ratio is not restricted by the maximum secondary scanning speed of the image scanning part. Consequently, it is not necessary to have the torque or the mechanism of the secondary scanning motor be comparable to high-speed secondary scanning only for the purpose of reducing the minimum zoom ratio.

When a zoom ratio in the range in which N/M is 1 (the secondary scanning speed is from Vmin to Vmax) is set, a copying operation is performed in the real-time copy mode. Therefore, the speed for the first copy time is equal to that of the conventional copier. When a zoom ratio with N/M being less than 1 is set, a copying operation is performed in the memory copy mode. Therefore, the speed for the first copy time is lower than that of the conventional copier. However, the zoom ratio frequently used is 0.7 or more, as in the case of contraction copying from an A3 size document to an A4 size recording paper. Therefore, when Vmax is set to about a value of the secondary scanning speed for equal size copying $V_0/0.7$, the speed for the first copy time is rarely reduced. In the case of successive copying of the same document, the images are read from the image memory for printing, so that the speed is not reduced.

EXAMPLE 6

The flow of image signals of a digital copier of Example 6 of the present invention will be described with reference to FIG. 2. The basic structure of Example 6 is the same as that of Example 2, and therefore it is not described herein.

In Example 5 described earlier, the image memory is required although it is not required for a conventional digital copier. In the case of a multivalued image signal, large memory capacity is required, which raises the cost. In Example 6, the image signal is stored in the image memory 81 in the form of a binary image signal. Thus, the memory capacity of the image memory 81 required is reduced. Furthermore, since the binary-to-multivalue conversion circuit 83 restores the binary image signal to a multivalued image signal, the degradation of copying quality due to the pseudo-half-tone processing (binary processing) can be prevented.

In FIG. 2, a path F' can be used in the real-time copy mode in place of the path F.

EXAMPLE 7

The flow of image signals of a digital copier of Example 7 of the present invention will be described with reference to FIG. 3. The basic structure of Example 7 is the same as that of Example 3, and therefore it is not described herein.

In this example, the memory capacity of the image memory 81 can be reduced further than in Example 6. Furthermore, as in Example 6, since the binary-to-multivalue conversion circuit 83 restores the binary image signal to a multivalued image signal, the degradation of copying quality due to the pseudo-half-tone processing can be prevented. In FIG. 3, a path H' can be used in the real-time copy mode in place of the path H.

EXAMPLE 8

The flow of image signals of an image reader of Example 8 of the present invention will be described with reference to FIG. 5. The basic structure of Example 8 is the same as that of Example 4, and therefore it is not described herein. This image reader is obtained by using the configuration of the secondary scanning zoom in Example 5 as an image reader, and corresponds to the mechanical structure of the image scanning part in FIG. 10.

A line thinning circuit 80 thins out the image signals from the image processing circuit 73 to N/M. A microcontroller 90 sets a thinning ratio N/M to the line thinning circuit 80 via a bus 94. A line buffer memory 74 buffers the image signal 60 or an image signal 61 read from the image memory 81 and outputs the signals to a video data output I/F. The video data output interface 98 outputs image data and synchronous signals such as a pixel clock, a line enable signal, vertical enable signals and the like to external equipment.

The microcontroller 90 calculates the line thinning ratio N/M and the secondary scanning speed V of the image scanning part from the secondary scanning resolution r (dpi) that has been set, pursuant to the following equations:

$$V = \max(\min(V_{max}, V_0 \cdot r_0/r), V_{min})$$

$$N/M = r_0/r \cdot V/V_0$$

where $r_0$ represents a reference resolution (dpi), $V_0$ represents a secondary scanning speed of the image scanning part at the reference resolution, max (a, b) represents an operator for selecting the larger argument, min (a, b) represents an operator for selecting the smaller argument, and Vmax and Vmin are the maximum value and the minimum value of the secondary scanning speed, respectively. When N/M is 1, line thinning is not necessary. In the image reader of this example, since the secondary scanning speed of the image scanning part does not exceed Vmax in any reading resolution. Therefore, the minimum reading resolution is not restricted by the maximum secondary scanning speed of the image scanning part.

EXAMPLE 9

In Example 5, the range in which the secondary scanning speed of the image scanning part can be set is from Vmin to Vmax. In addition to that range, a speed Mi smaller than Vmin can be set as a spot outside the range. A plurality of speeds may be set. For example, Vmin=$0.7 \cdot V_0$, Vmax=$1.4 \cdot V_0$, $V_1$=$0.25 \cdot V_0$, and $V_2$=$0.5 \cdot V_0$, $V_1$ and $V_2$ are secondary scanning speeds that can be set as spots.

When the resolution r exceeds $r_0 \cdot V_0$/Vmin, the image reader cannot be performed in Example 5. However, in this example, in the case of r>$r_0 V_0$/Vmin, expansion can be performed as desired by setting as follows:

$$V = Vi$$

$$N/M = (r/r_0) \cdot (V/V_0)$$

It is easy to reduce the secondary scanning speed in terms of the torque of the secondary scanning driving motor. However, when the range in which the speed can be set is widened toward a smaller speed continuously, a large number of problems are posed. For example, vibration or noise becomes large, or a necessary secondary scanning precision cannot be obtained. In general, when the range in which the speed can be set is widened continuously, it is necessary to satisfy the secondary scanning precision in the entire range of the speed, which is difficult to realize technically and raises cost. In this example, the resolution for the secondary scanning can be widened by setting several secondary scanning speeds as spots, in addition to the continuous range in which the secondary scanning speed can be set. Thus, it is sufficient to ensure the secondary scanning precision only for the added secondary scanning speeds, which is easy.

It is apparent that when this example is applied to the image reader of Example 8, the same effect can be obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image reader comprising:

reading means for electrically scanning lines of image information of a document in a primary scanning direction at a predetermined cycle to output image signals for the lines;

secondary scanning means for mechanically moving a primary scanning position with resect to the document at a constant secondary scanning speed V in a secondary scanning direction perpendicular to the primary scanning direction; and line thinning means for thinning out lines for the image signals to N/M where N and M are integers: $N \leq M$;

wherein a continuous variation range in which the secondary scanning speed V can be varied is from Vmin to Vmax, and the lines of image information of the document are read at an arbitrary resolution in the secondary scanning direction by combining a value of N/M and a value of the secondary scanning speed V, wherein secondary scanning can be performed at a speed Vi that is smaller than Vmin and is outside and non-adjacent to the variation range.

2. A digital copier comprising an image reading part and a printing part, the image reading part comprising:

reading means for electrically scanning lines of image information of a document in a primary scanning direction at a predetermined cycle to output image signals for the lines;

secondary scanning means for mechanically moving a primary scanning position with respect to the document at a constant secondary scanning speed V in a secondary scanning direction perpendicular to the primary scanning direction; and line thinning means for thinning out lines for the image signals to 1/N where N is an integer; and the printing part prints an image on a printing medium based on the image signals supplied from the image reading part, wherein the lines of image information of the document are copied at an arbitrary zoom ratio in the secondary scanning direction by combining a value of the integer N and a value of the secondary scanning speed V, wherein a value of the integer N and a value of the secondary scanning speed V are determined based on the following equations:

$N = INT(R_0/R)$ $V = V_0/(N \cdot R)$ where R represents a zoom ratio in the secondary scanning direction that can be set arbitrarily, $R_0$ represents a preset reference zoom ratio, INT () represents an operator for rounding up decimals to a next integer, and $V_0$ represents a reference secondary scanning speed at the zoom ratio $R_0$, wherein the image reading part comprises an image memory for storage image signals thinned out by the line thinning means, and the image reading part is configured so that when the set zoom ratio R is equal to or more than the reference zoom ratio $R_0$, the image signals from the reading means are supplied to the printing part without line thinning, and when the set zoom ratio R is less than the reference zoom ratio $R_0$, the image signals thinned out are supplied to the printing part via the image memory.

3. The digital copier according to claim 2, wherein the image memory is a FIFO memory, and the image reading part is configured so that when image signals corresponding to (N−1)/N of image signals for one page are stored in the image memory, the image signals stored in the image memory are sequentially output to the printing part to start printing the images.

4. A digital copier comprising an image reading part and a printing part, the image reading part comprising:

reading means for electrically scanning lines of image information of a document in a primary scanning direction at a predetermined cycle to output image signals for the lines;

secondary scanning means for mechanically moving a primary scanning position with respect to the document at a constant secondary scanning speed V in a secondary scanning direction perpendicular to the primary scanning direction; and line thinning means for thinning out lines for the image signals to 1/N where N is an integer; and the printing part prints an image on a printing medium based on the image signals supplied from the image reading part, wherein the lines of image information of the document are copied at an arbitrary zoom ratio in the secondary scanning direction by combining a value of the integer N and a value of the secondary scanning speed V, wherein a value of the integer N and a value of the secondary scanning speed V are determined based on the following equations:

$N = INT(R_0/R)$ $V = V_0/(N \cdot R)$ where R represents a zoom ratio in the secondary scanning direction that can be set arbitrarily, $R_0$ represents a preset reference zoom ratio, INT () represents an operator for rounding up decimals to a next integer, and $V_0$ represents a reference secondary scanning speed at the zoom ratio $R_0$, wherein the image reading part comprises a pseudo-halftone processing circuit by a dot area modulation method for binarizing the image signals thinned out by the line thinning means, an image memory for storing the binarized image signals, a binary-to-multivalue conversion circuit for conversing the binary image signals read from the image memory to multivalued image signals, and the image reading part is configured so that when the set zoom ratio R is equal to or more than the reference zoom ratio $R_0$, the multivalued image signals from the reading means are supplied to the printing part without line thinning, and when the set zoom ratio R is less than the reference zoom ratio $R_0$, the image signals thinned out are supplied to the printing part via the pseudo-half-tone processing circuit, the image memory, and the binary-to-multivalue conversion circuit.

5. A digital copier comprising an image reading part and a printing part, The image reading part comprising:

reading means for electrically scanning lines of image information of a document in a primary scanning direction at a predetermined cycle to output image signals for the lines;

secondary scanning means for mechanically moving a primary scanning position with respect to the document at a constant secondary scanning speed V in a secondary scanning direction perpendicular to the primary scanning direction; and line thinning means for thinning out lines for the image signals to 1/N where N is an integer; and the printing part prints an image on a printing medium based on the image signals supplied from the image reading part, wherein the lines of image information of the document are copied at an arbitrary zoom ratio in the secondary scanning direction by combining a value of the integer N and a value of the secondary scanning speed V, wherein a value of the integer N and a value of the secondary scanning speed V are determined based on the following equations:

$$N=INT(R_0/R)$$
$$V=V_0/(N \cdot R)$$

where R represents a zoom ratio in the secondary scanning direction that can be set arbitrarily, $R_0$ represents a preset reference zoom ratio, INT () represents an operator for rounding up decimals to a next integer, and $V_0$ represents a reference secondary scanning speed at the zoom ratio $R_0$, wherein the image reading part comprises a pseudo-half-tone processing circuit by a dot area modulation method for binarizing the image signals thinned out by the line thinning means, a compression circuit for compressing the binarized image signals, an image memory for storing the compressed image signals, an expansion circuit for expanding the compressed signals read from the image memory, a binary-to-multivalue conversion circuit for conversing the expanded binary image signals to multivalued image signals, and the image reading part is configured so that when the set zoom ratio R is equal to or more than the reference zoom ratio $R_0$, the multivalued image signals from the reading means are supplied to the printing part without line thinning, and when the set zoom ratio R is less than the reference zoom Ratio $R_0$, the image signals thinned out are supplied to the printing part via the pseudo-half-tone processing circuit, the compression circuit, the image memory, the expansion circuit and the binary-to-multivalue conversion circuit.

6. A digital copier comprising an image reading part and a printing part, the image reading part comprising reading means for electrically scanning lines of image information of a document in a primary scanning direction at a predetermined cycle to output image signals for the lines;

secondary scanning means for mechanically moving a primary scanning position with respect to the document at a constant secondary scanning speed V in a secondary scanning direction perpendicular to the primary scanning direction; and line thinning means for thinning out lines for the image signals to N/M where N and M are integers: $N \leq M$;

the printing part printing an image on a printing medium based on the image signals supplied from the image reading part, wherein a continuous variation range in which the secondary scanning speed V can be varied is from Vmin to Vmax, the lines of image information of the document are copied at an arbitrary zoom ratio in the secondary scanning direction by combining a value of N/M and a value of the secondary scanning speed V, wherein the image reading part comprises an image memory for storing image signals thinned out by the line thinning means, and the image reading part is configured so that when N/M is equal to 1, the image signals from the reading means are supplied to the printing part without going through the image memory, and when N/M is less than 1, the image signals thinned out by the line thinning means are supplied to the printing part via the image memory.

7. A digital copier comprising an image reading part and a printing part, the image reading part comprising reading means for electrically scanning lines of image information of a document in a primary scanning direction at a predetermined cycle to output image signals for the lines;

secondary scanning means for mechanically moving a primary scanning position with respect to the document at a constant secondary scanning speed V in a secondary scanning direction perpendicular to the primary scanning direction; and line thinning means for thinning out lines for the image signals to N/M where N and M are integers: $N \leq M$;

the printing part printing an image on a printing medium based on the image signals supplied from the image reading part, wherein a continuous variation range in which the secondary scanning speed V can be varied is from Vmin to Vmax, the lines of image information of the document are copied at an arbitrary zoom ratio in the secondary scanning direction by combining a value of N/M and a value of the secondary scanning speed V, wherein the image reading part comprises a pseudo-half-tone processing circuit by a dot area modulation method for binarizing the image signals thinned out by the line thinning means, an image memory for storing the binarized image signals, a binary-to-multivalue conversion circuit for conversing the binary image signals to multivalued image signals, and the image reading part is configured so when N/M is less than 1, the image signals thinned out by the line thinning means are supplied to the printing part via the pseudo-half-tone processing circuit, the image memory and the binary-to-multivalue conversion circuit, and when N/M is equal to 1, the image signals from the reading means are supplied to the printing part without going through the image memory.

8. A digital copier comprising an image reading part and a printing part, the image reading part comprising reading means for electrically scanning lines of image information of a document in a primary scanning direction at a predetermined cycle to output image signals for the lines;

secondary scanning means for mechanically moving a primary scanning position with respect to the document at a constant secondary scanning speed V in a secondary scanning direction perpendicular to the primary scanning direction; and line thinning means for thinning out lines for the image signals to N/M where N and M are integers: $N \leq M$;

the printing part printing an image on a printing medium based on the image signals supplied from the image reading part, wherein a continuous variation range in which the secondary scanning speed V can be varied is from Vmin to Vmax, the lines of image information of the document are copied at an arbitrary zoom ratio in the secondary scanning direction by combining a value of N/M and a value of the secondary scanning speed V, wherein the image reading part comprises a pseudo-half-tone processing circuit by a dot area modulation method for binarizing the image signals thinned out by the line thinning means, a compression circuit for compressing the binarized image signals, an image memory for storing the compressed image signals, an expansion circuit for expanding the compressed signals read from the image memory, a binary-to-multivalue conversion circuit for conversing the expanded binary image signals to multivalued image signals, and the image reading part is configured so when N/M is less than 1, the image signals thinned out by the line thinning means are supplied to the printing part via the pseudo-half-tone processing circuit, the compression circuit, the image memory, the expansion circuit and the binary-to-multivalue conversion circuit, and when N/M is equal to 1, the image signals from the reading means are supplied to the printing part without going through the image memory.

9. A digital copier comprising an image reading part and a printing part, the image reading part comprising reading means for electrically scanning lines of image information of a document in a primary scanning direction at a predetermined cycle to output image signals for the lines;

secondary scanning means for mechanically moving a primary scanning position with respect to the document at a constant secondary scanning speed V in a secondary scanning direction perpendicular to the primary scanning direction; and line tinning means for thinning out lines for the image signals to N/M where N and M are integers: $N \leq M$;

the printing part printing an image on a printing medium based on the image signals supplied from the image reading part, wherein a continuous variation range in which the secondary scanning speed V can be varied is from Vmin to Vmax, the lines of image information of the document are copied at an arbitrary zoom ratio in the secondary scanning direction by combining a value of N/M and a value of the secondary scanning speed V, and wherein secondary scanning can be performed at a speed Vi that is smaller than Vmin and is outside and non-adjacent to the variation range.

* * * * *